US012638102B2

(12) United States Patent
Haller

(10) Patent No.: US 12,638,102 B2
(45) Date of Patent: May 26, 2026

(54) DETECTING PICKUP AND DROPOUT OF SOLENOID VALVE

(71) Applicant: Automatic Switch Company, Florham Park, NJ (US)

(72) Inventor: John J. Haller, Boonton, NJ (US)

(73) Assignee: Automatic Switch Company, Florham Park, NJ (US)

( * ) Notice: Subject to any disclaimer, the term of this patent is extended or adjusted under 35 U.S.C. 154(b) by 476 days.

(21) Appl. No.: 18/170,491

(22) Filed: Feb. 16, 2023

(65) Prior Publication Data

US 2024/0280189 A1 Aug. 22, 2024

(51) Int. Cl.
*F16K 37/00* (2006.01)
*H01F 7/06* (2006.01)
*H01F 7/08* (2006.01)

(52) U.S. Cl.
CPC ......... *F16K 37/0041* (2013.01); *H01F 7/064* (2013.01); *H01F 7/081* (2013.01)

(58) Field of Classification Search
CPC .... F02D 41/009; F02D 41/0097; F02P 15/10; F02P 3/0456; F02P 3/053; F02P 3/055; F02P 3/0552; F02P 5/15; F02P 5/1502; F02P 7/0775; F02P 9/005; F16K 31/0675; F16K 37/0025; F16K 37/0041; H01F 2007/1684; H01F 2007/185; H01F 2007/1866; H01F 38/12; H01F 7/064; H01F 7/081; H01F 7/16; H01F 7/1805; H01F 7/1844; H01T 15/00; Y02T 10/46
See application file for complete search history.

(56) References Cited

U.S. PATENT DOCUMENTS 5,245,501 A 9/1993 Locher et al.
5,650,909 A 7/1997 Remele et al.
(Continued)

FOREIGN PATENT DOCUMENTS

DE 102004056653 B4 6/2006
EP 0400389 A3 6/1989
(Continued)

OTHER PUBLICATIONS

Extended European Search Report dated Jul. 4, 2024 for EP Patent Application 24157257.7.
(Continued)

*Primary Examiner* — Scott Bauer
*Assistant Examiner* — Nicolas Bellido
(74) *Attorney, Agent, or Firm* — Mackey Law Firm PLLC

(57) ABSTRACT

A method of operating a solenoid valve can include applying power to a coil of the solenoid valve, interrupting power to the coil upon a first increase in power consumption of the coil, detecting a first on-time when power is applied to the coil, re-applying power to the coil upon a first condition becoming satisfied, interrupting power to the coil upon a second increase in power consumption of the coil, detecting a second on-time when power is re-applied to the coil, comparing the first on-time with the second on-time, and detecting when an armature of the solenoid valve has physically shifted based at least in part on the comparing. Detecting when the armature of the solenoid valve has physically shifted can include determining that the second on-time is greater than the first on-time.

20 Claims, 8 Drawing Sheets

(56) References Cited

U.S. PATENT DOCUMENTS

| | | | |
|---|---|---|---|
| 6,188,562 | B1 | 2/2001 | Lutz et al. |
| 7,483,253 | B2 * | 1/2009 | Schumacher ......... H01F 7/1805 |
| | | | 361/160 |
| 7,596,442 | B2 | 9/2009 | Aigner et al. |
| 7,738,234 | B2 | 6/2010 | Oide |
| 7,853,360 | B2 | 12/2010 | Fernandez et al. |
| 8,528,599 | B2 | 9/2013 | Morgan et al. |
| 8,681,468 | B2 | 3/2014 | Jacob et al. |
| 8,925,566 | B2 | 1/2015 | Haller |
| 9,435,458 | B2 | 9/2016 | Needham et al. |
| 9,782,577 | B2 | 10/2017 | Bedingfield |
| 9,864,384 | B2 | 1/2018 | Brantweiner et al. |
| 10,247,146 | B2 | 4/2019 | Hashimoto |
| 10,288,186 | B2 | 5/2019 | Gardt et al. |
| 10,295,077 | B2 | 5/2019 | Haller |
| 10,520,334 | B2 | 12/2019 | Creech et al. |
| 10,539,250 | B2 | 1/2020 | Mahajan et al. |
| 10,755,881 | B2 | 8/2020 | Thron et al. |
| 10,832,846 | B2 | 11/2020 | Haller |
| 10,837,574 | B2 | 11/2020 | Schrader |
| 11,167,296 | B2 | 11/2021 | Fritz et al. |
| 11,424,061 | B2 | 8/2022 | Shaffer |
| 11,610,707 | B2 * | 3/2023 | Tokura .................... H01F 7/081 |
| 2007/0279047 | A1 * | 12/2007 | Schumacher ......... H01F 7/1844 |
| | | | 324/207.16 |
| 2011/0149458 | A1 | 6/2011 | Thomas et al. |
| 2017/0023147 | A1 * | 1/2017 | Haller .................. H01F 7/1805 |
| 2021/0222795 | A1 | 7/2021 | Lesage et al. |
| 2021/0304937 | A1 | 9/2021 | Tokura et al. |
| 2021/0381620 | A1 | 12/2021 | Michel et al. |
| 2022/0373097 | A1 | 11/2022 | Watzer et al. |
| 2024/0247954 | A1 * | 7/2024 | Lawton ................. F02D 41/345 |

FOREIGN PATENT DOCUMENTS

| | | | |
|---|---|---|---|
| EP | 0400389 | A2 | 12/1990 |
| EP | 1830370 | A2 | 9/2007 |
| WO | WO-2006033165 | A1 * | 3/2006 ............... B66B 5/06 |

OTHER PUBLICATIONS https://go4trans.com/technical-transmission-general-articles/pwm-frequency-duty-cycle/, PWM, Frequency Duty Cycle, Worldwide Transmission Rebuilders Marketplace, pp. 1-5; Accessed Dec. 6, 2022.

https://intertechdevelopment.com/industrial-solutions/pwm-solenoid-valve/, PWN Solenoid Valve Functional Testing Equipment & Systems | InterTech, pp. 1-2; Accessed Dec. 6, 2022.

https://blog.parker.com/site/usa/en-US/details-home-page/pulse-width-modulation-control-for-solenoid-valves-us Parker, Pulse Width Modulation Control for Solenoid Valves, pp. 1-6; Accessed Dec. 6, 2022.

Jung et al., "Resistance Estimate of a PWM-Driven Solenoid," International Journal of Automotive Technology, vol. 8, No. 2, pp. 249-258 (2007).

https://www.agriculture.com/machinery/maintenance-repair/testing-a-pulse-width-modulated-circuit_567-ar47300; "Testing a Pulse Width Modulation Circuit", agriculture.com. Feb. 2, 2015; Accessed Dec. 6, 2022.

* cited by examiner

Dropout Detected

Pickup Detected

Hold

Energize

Hold

DETECTING PICKUP AND DROPOUT OF SOLENOID VALVE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to solenoid valves and more specifically relates to operating and monitoring low power solenoid valves.

DESCRIPTION OF THE RELATED ART

Some low power solenoid controllers apply a high coil power for a fixed time, to allow the solenoid to open, and then reduce the power to a lower value. The fixed, high-power time generally is based on the worst-case response time of the solenoid valve. The lower power generally is the minimum power required to keep the valve energized, providing reasonable protection from the valve dropping out and closing. However, when high power is applied for a fixed time and the valve responds sooner than the time allotted, energy is wasted. Furthermore, during the holding period, it is generally assumed that the valve has remained open. If some mechanical shock or vibration has occurred and caused the valve to go into the closed state, a standard controller has no way of making the determination that the valve has changed state, and thus the valve will remain closed until power is cycled again. There is a need in the art for improved operation and monitoring of low power solenoid valves.

BRIEF SUMMARY OF THE INVENTION

Applicants have created new and useful devices, systems and methods for detecting when an armature of a solenoid valve has physically shifted.

In at least one embodiment, a method of operating a solenoid valve can include applying power to a coil of the solenoid valve, interrupting power to the coil upon a first increase in power consumption of the coil, detecting a first on-time when power is applied to the coil, re-applying power to the coil upon a first condition becoming satisfied, interrupting power to the coil upon a second increase in power consumption of the coil, detecting a second on-time when power is re-applied to the coil, comparing the first on-time with the second on-time, detecting when an armature of the solenoid valve has physically shifted based at least in part on the comparing, or any combination thereof. In at least one embodiment, detecting when the armature of the solenoid valve has physically shifted can include determining that the second on-time is at least 38% greater or less than the first on-time. In at least one embodiment, a method of operating a solenoid valve can include holding the armature of the solenoid valve in position by repeatedly cycling power to the coil of the solenoid valve, wherein power is applied to the coil until a voltage associated with the coil reaches a first threshold and power to the coil is interrupted until the voltage associated with the coil reaches a second threshold.

In at least one embodiment, the first and second increases in power consumption of the coil can be detected by monitoring a voltage associated with power being applied to the coil. In at least one embodiment, the first and second increases in power consumption of the coil can be detected by monitoring a current through the coil. In at least one embodiment, the first and/or the second increase in power consumption of the coil can be a predetermined value, which can be less than that required to cause the armature of the solenoid valve to physically shift.

In at least one embodiment, the first condition can be a decrease in a voltage associated with the coil, a current drop through the coil, a predetermined period of time, or any combination thereof. In at least one embodiment, detecting when the armature of the solenoid valve has physically shifted can include determining that the second on-time is greater and/or less than the first on-time.

In at least one embodiment, a method of operating a solenoid valve can include applying power to a coil of the solenoid valve, interrupting power to the coil upon a power consumption of the coil meeting a first threshold, detecting a first on-time when power is applied to the coil, re-applying power to the coil upon the power consumption of the coil meeting a second threshold, interrupting power to the coil upon the power consumption of the coil meeting the first threshold, detecting a second on-time when power is re-applied to the coil, comparing the first on-time with the second on-time, detecting when an armature of the solenoid valve has physically shifted based at least in part on the comparing, or any combination thereof. In at least one embodiment, detecting when the armature of the solenoid valve has physically shifted can include determining that the second on-time is greater and/or less than the first on-time. In at least one embodiment, detecting when the armature of the solenoid valve has physically shifted can include determining that the second on-time is at least 38% greater or less than the first on-time.

In at least one embodiment, a method of operating a solenoid valve can include reversing the physical shift of the armature of the solenoid valve upon detecting that the armature of the solenoid valve has physically shifted. In at least one embodiment, reversing the physical shift of the armature of the solenoid valve can include repeatedly cycling power to the coil. In at least one embodiment, power can be applied to the coil until an increase in power consumption of the coil occurs, when the power applied to the coil can be interrupted until a first condition is satisfied.

In at least one embodiment, the first threshold can include a first voltage associated with the coil rising to a first voltage. In at least one embodiment, the second threshold can include the first voltage associated with the coil falling to a second voltage. In at least one embodiment, the first threshold can include a current through the coil rising to a first amperage. In at least one embodiment, the second threshold can include a current through the coil falling to a second amperage.

In at least one embodiment, a method of operating a solenoid valve can include physically shifting an armature of the solenoid valve in a first direction, detecting when the armature of the solenoid valve has physically shifted in the first direction, holding the armature of the solenoid valve in position, detecting when the armature of the solenoid valve has physically shifted in a second direction, or any combination thereof.

In at least one embodiment, physically shifting an armature of the solenoid valve in a first can include applying power to a coil of the solenoid valve, interrupting power to the coil upon a first increase in power consumption of the coil, detecting a first on-time when power is applied to the coil, re-applying power to the coil upon a first condition becoming satisfied, interrupting power to the coil upon a second increase in power consumption of the coil, detecting a second on-time when power is re-applied to the coil, comparing the first on-time with the second on-time, or any combination thereof. In at least one embodiment, detecting when the armature of the solenoid valve has physically shifted in the first direction can include determining that the second on-time is greater than the first on-time. In at least one embodiment, detecting when the armature of the solenoid valve has physically shifted can include determining that the second on-time is at least 38% greater or less than the first on-time.

In at least one embodiment, holding the armature of the solenoid valve in position can include re-applying power to the coil of the solenoid valve, interrupting power to the coil upon a power consumption of the coil meeting a first threshold, detecting a third on-time when power is re-applied to the coil, re-applying power to the coil of the solenoid valve upon the power consumption of the coil meeting a second threshold, interrupting power to the coil upon the power consumption of the coil meeting the first threshold, detecting a fourth on-time when power is re-applied to the coil, comparing the third on-time with the fourth on-time, or any combination thereof. In at least one embodiment, detecting when the armature of the solenoid valve has physically shifted in a second direction can include determining that the fourth on-time is less than the third on-time.

DETAILED DESCRIPTION OF THE INVENTION

Figure 1:
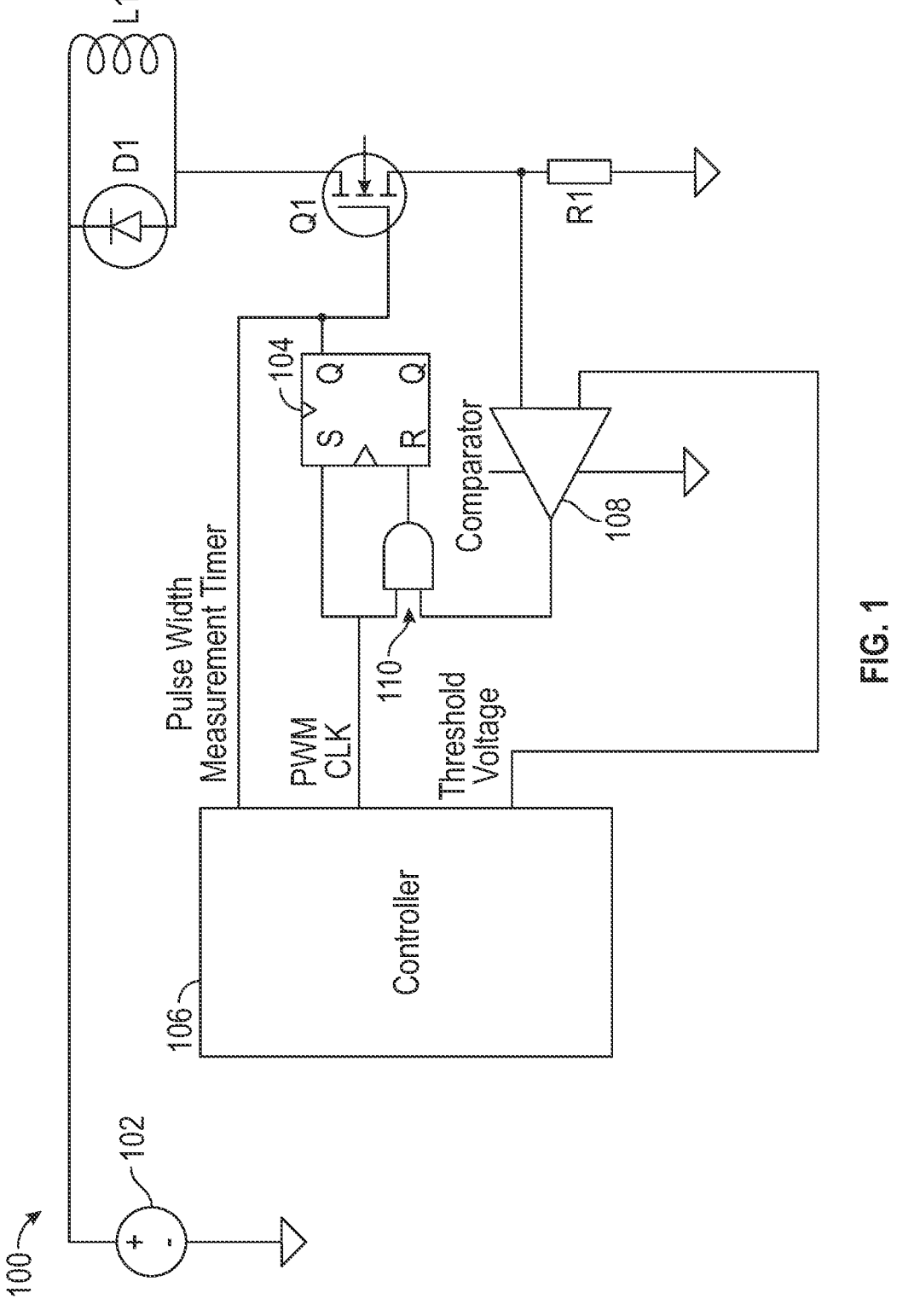
FIG. 1 is a schematic of one of many embodiments of a system for operating and monitoring a solenoid valve according to the disclosure.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Process flowcharts discussed herein illustrate the operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Figure 2:
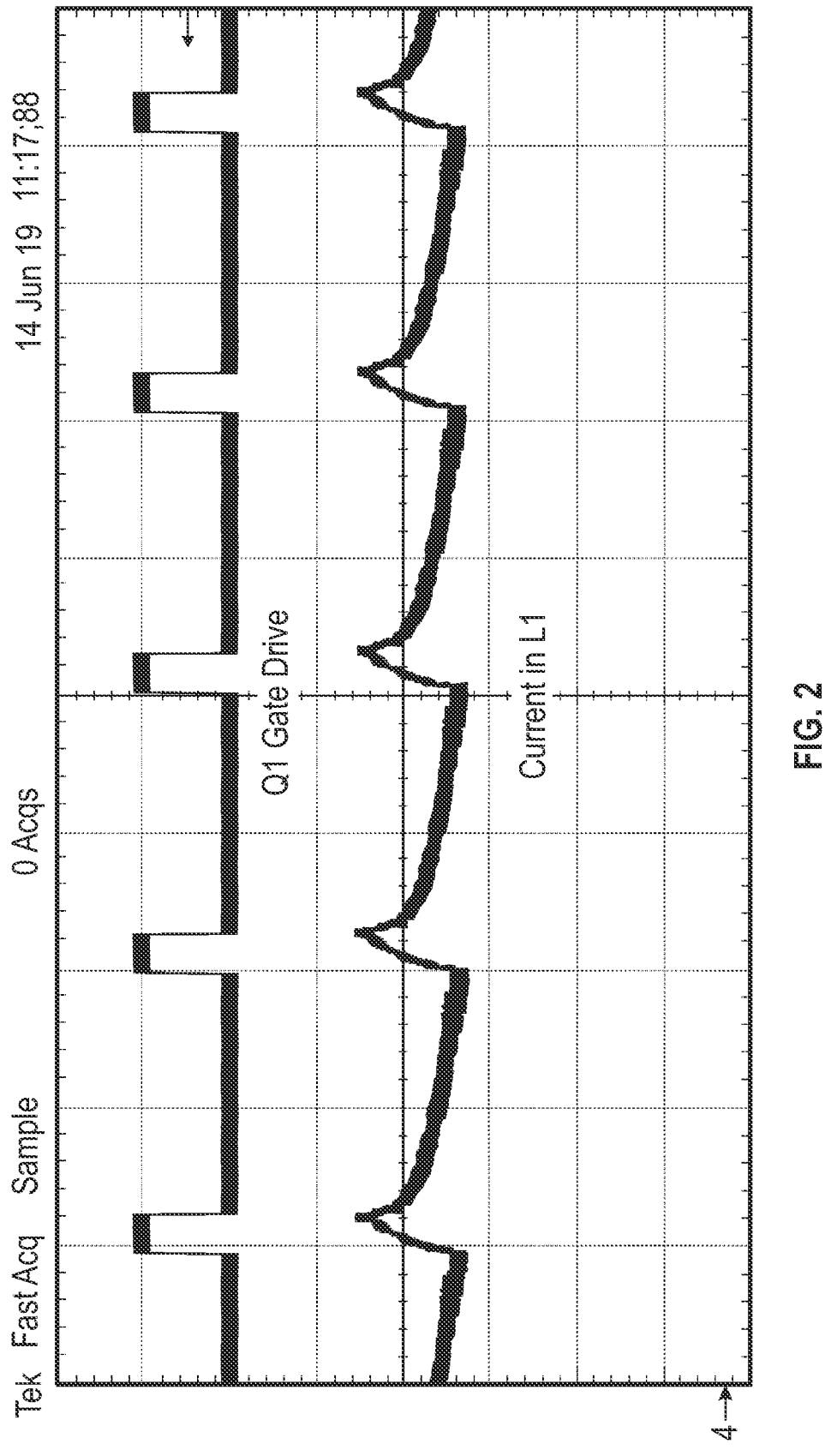
FIG. 2 is a voltage and current waveform associated with one of many embodiments of a system for operating and monitoring a solenoid valve according to the disclosure.
Figure 3:
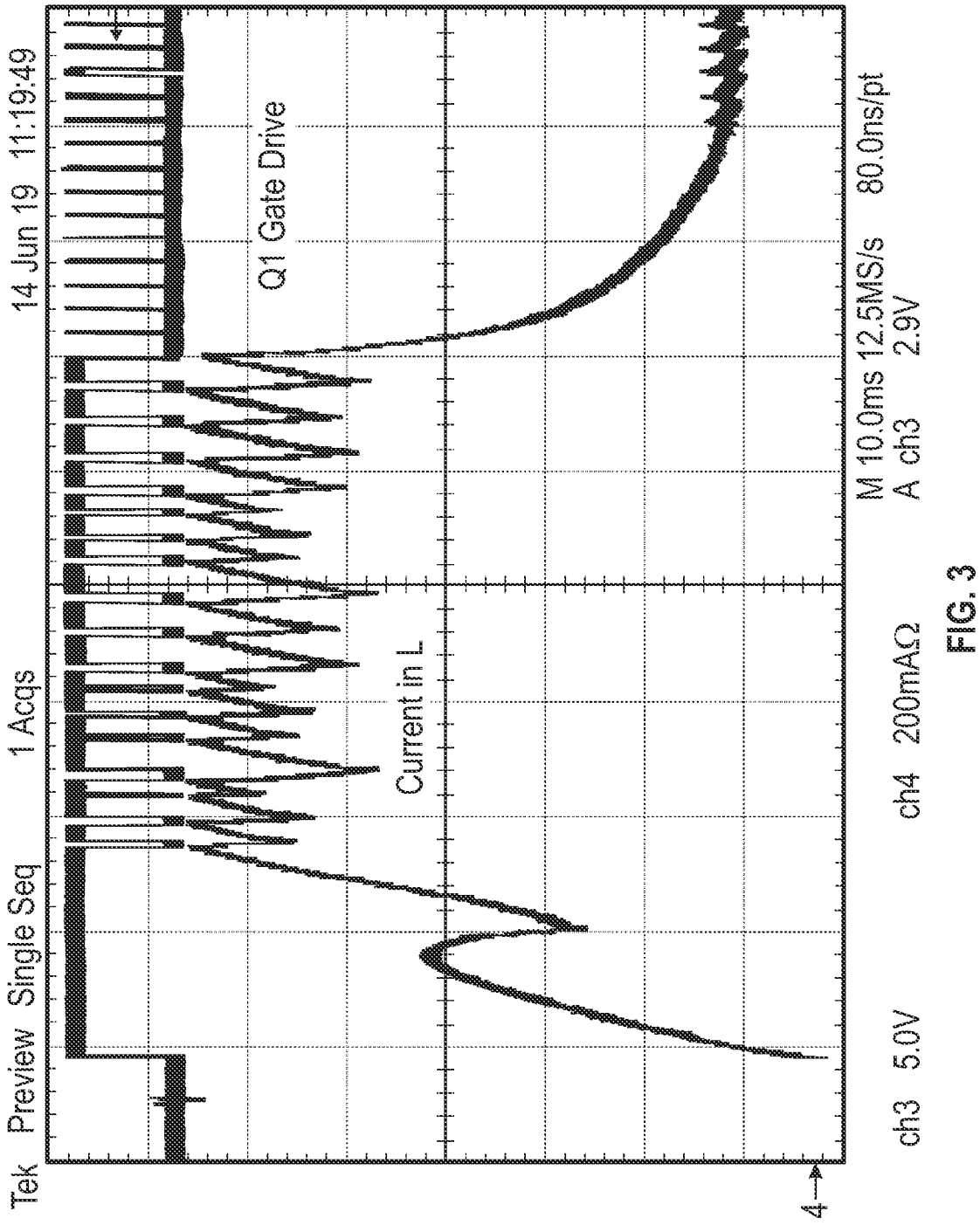
FIG. 3 is another voltage and current waveform associated with one of many embodiments of a system for operating and monitoring a solenoid valve according to the disclosure.
Figure 4:
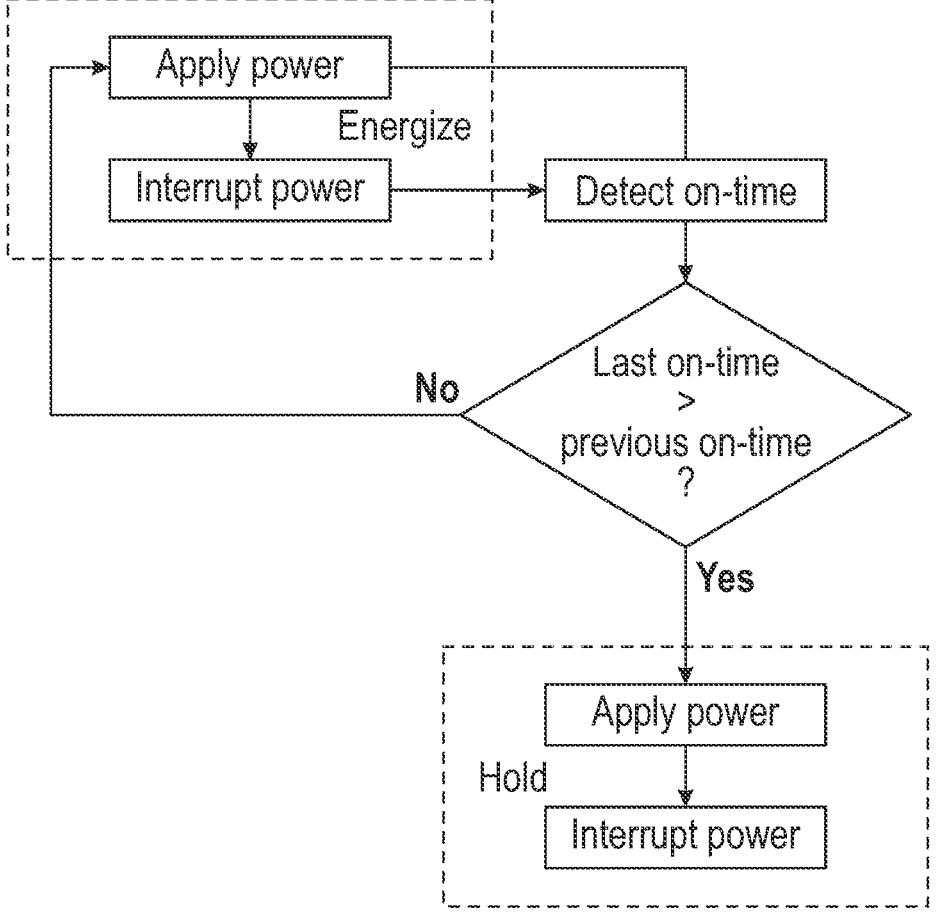
FIG. 4 is a flow chart one of many embodiments of a method for operating and monitoring a solenoid valve according to the disclosure.
Figure 5:
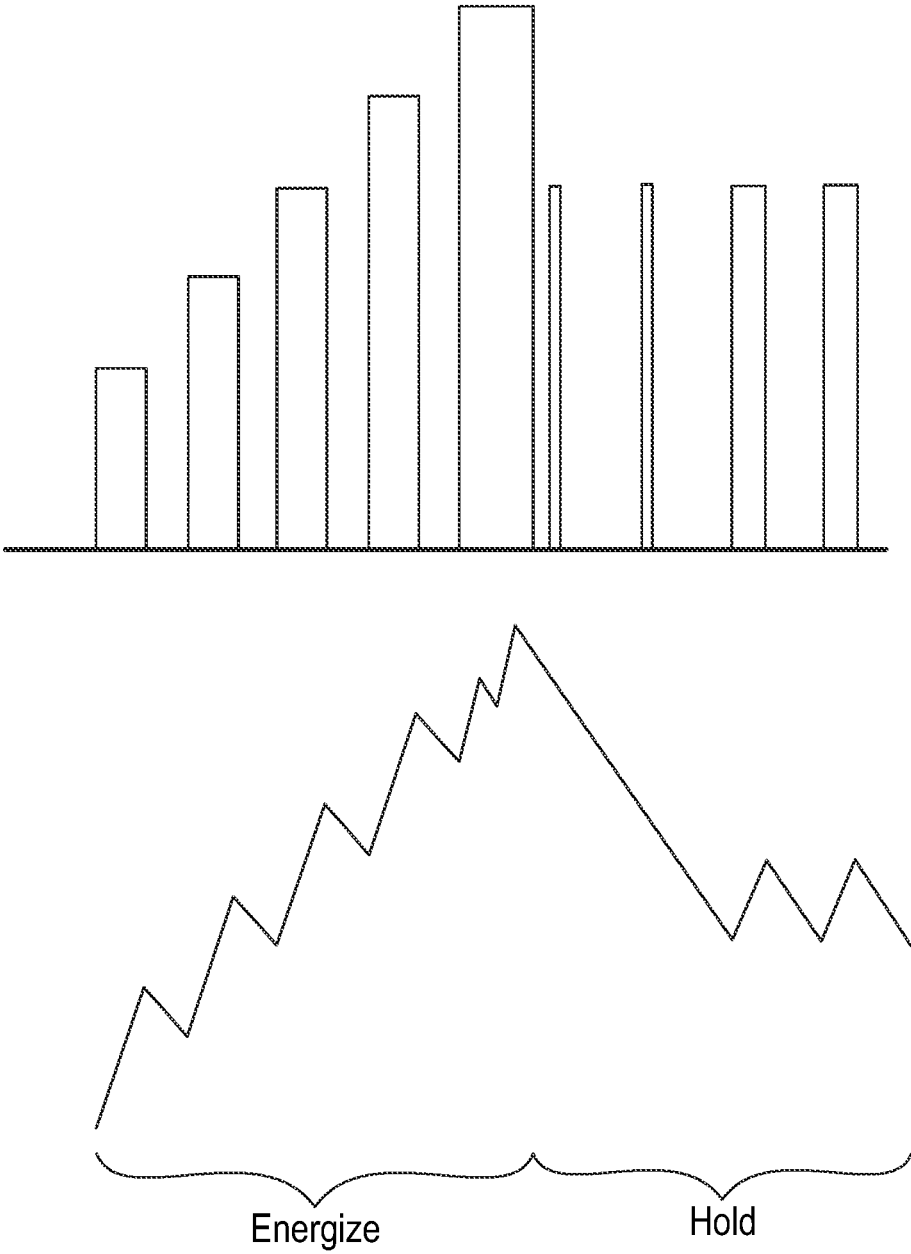
FIG. 5 is a voltage and current waveform associated with the method of FIG. 4.
Figure 6:
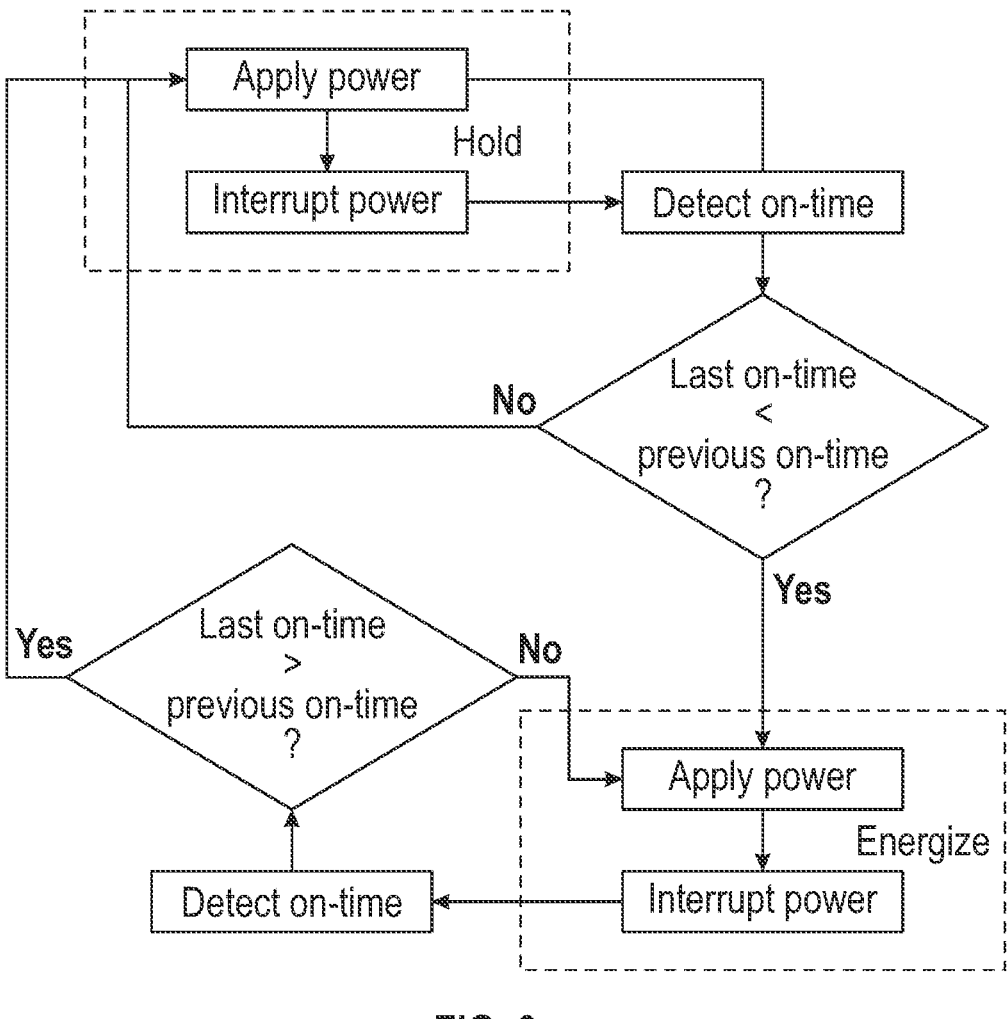
FIG. 6 is a flow chart of another one of many embodiments of a method for operating and monitoring a solenoid valve according to the disclosure.
Figure 7:
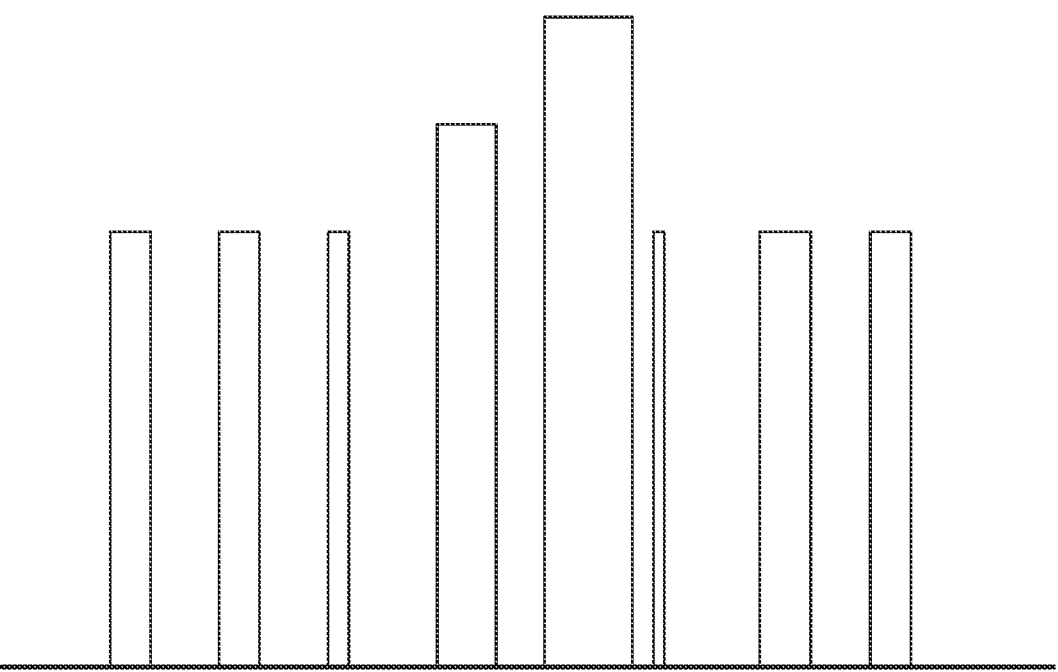
FIG. 7 is a voltage and current waveform associated with the method of FIG. 6.
Figure 7:
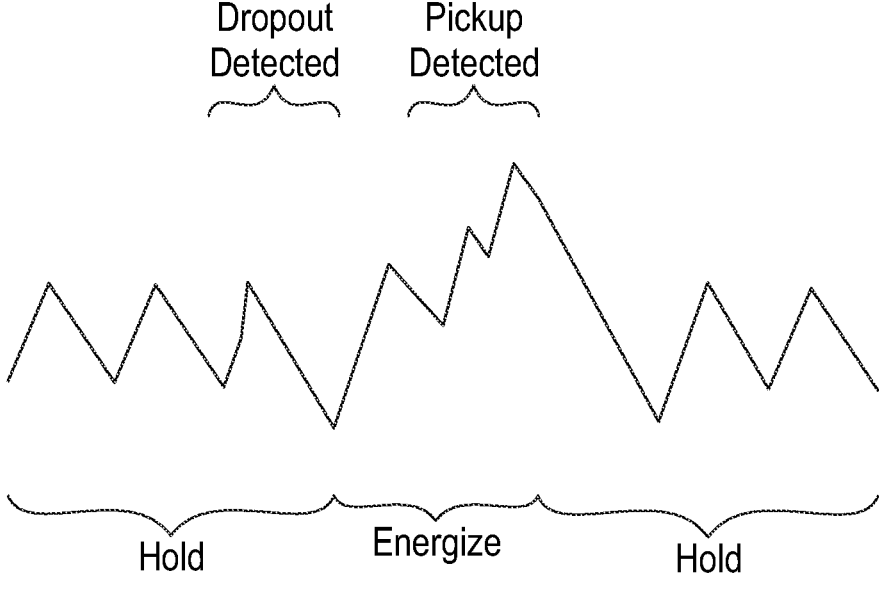
Figure 8:
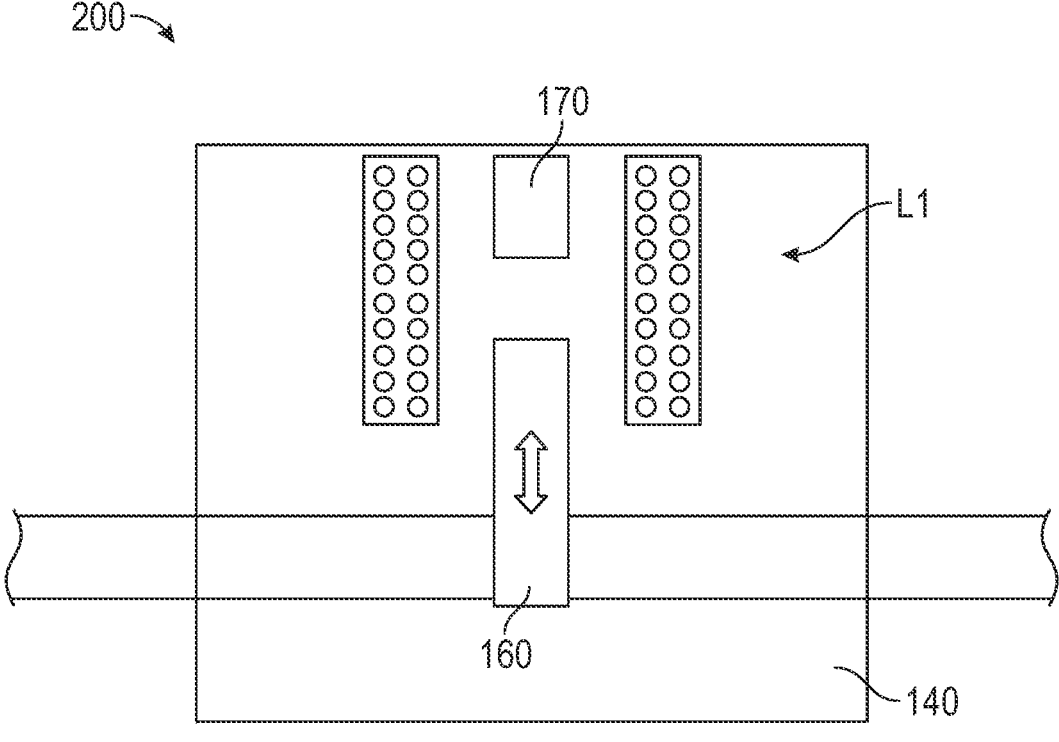
FIG. 8 is a block diagram of one of many embodiments of a solenoid valve according to the disclosure.

Applicants have created new and useful devices, systems and methods for detecting when an armature of a solenoid valve has physically shifted. FIG. 1 is a schematic of one of many embodiments of a system for operating and monitoring a solenoid valve according to the disclosure. FIG. 2 is a voltage and current waveform associated with one of many embodiments of a system for operating and monitoring a solenoid valve according to the disclosure. FIG. 3 is another voltage and current waveform associated with one of many embodiments of a system for operating and monitoring a solenoid valve according to the disclosure. FIG. 4 is a flow chart one of many embodiments of a method for operating and monitoring a solenoid valve according to the disclosure. FIG. 5 is a voltage and current waveform associated with the method of FIG. 4. FIG. 6 is a flow chart of another one of many embodiments of a method for operating and monitoring a solenoid valve according to the disclosure. FIG. 7 is a voltage and current waveform associated with the method of FIG. 6. FIG. 8 is a block diagram of one of many embodiments of a solenoid valve according to the disclosure. FIGS. 1-8 are described in conjunction with one another.

In at least one embodiment, a system 100 for operating and monitoring a solenoid valve can include a solenoid coil L1 connected between a direct current (DC) voltage source 102 and a drain terminal of a low side switch Q1. A source terminal of switch Q1 can be connected to a current sense resistor R1. The other side of the resistor R1 can be connected to a return path to the DC source 102. When voltage is applied to a gate terminal of Q1 current will flow through the coil L1, the switch Q1, and the resistor R1, and the rate of rise of that current is determined by the inductive time constant of the solenoid coil L1. When the voltage to the gate of the switch Q1 is removed the current will no longer flow through the switch Q1 and the resistor R1, however it will flow though the coil L1 and a diode D1 decaying to zero after time based on the time constant of the solenoid coil L1.

The gate terminal of the switch Q1 can be controlled by an SR latch 104. A Set input of the latch 104 can receive a clocking pulse, such as a short pulse width modulation (PWM) signal, from a controller 106, which can reoccur at a fixed interval. This pulse can set the Q terminal of the latch 104 high, which can drive the gate terminal of the switch Q1 high. As explained above this can cause current in the coil L1 to start to rise, and also since it is in series with said current flow the voltage drop across the resistor R1's will also increase. The voltage drop across the resistor R1 can be monitored by a comparator 108 and it can be compared to a reference voltage supplied by the controller 106.

When the voltage drop across the resistor R1 exceeds the voltage provided by the controller 106 the output of the comparator 108 will go high. The output of the comparator 108 can be connected to the reset input of the SR latch 104, which can cause the output Q of the latch 104 to go low thus turning off the switch Q1. In at least one embodiment, both the output of the comparator 108 and the clocking pulse from the controller 106 can be connected to the reset input of the SR latch 104, through a logical AND operator 110, with an inversion bubble on the input from the clocking pulse from the controller 106, in which case the output Q of the latch 104 will go low, thus turning off the switch Q1, when the output of the comparator 108 goes high and the clocking pulse from the controller 106 goes low. This operation can create a triangle current wave form in the coil L1 that will have a maximum value that is the reference voltage provided by the controller 106 divided by the value of the resistor R1 as shown in FIG. 2.

In at least one embodiment, the switch Q1 can initially stay on for the time that it takes the current in the coil L1 to reach the threshold of the comparator 108. The current in the coil L1 will increase following the inductive time constant of the solenoid coil L1. However, in a solenoid valve 200 with a moving armature 160, not a fixed inductor, when the force generated on the solenoid armature 160 exceeds the mechanical loading of the valve mechanism, the armature 160 will begin to accelerate. This acceleration will generate a back electromagnetic field (EMF) in the coil L1 which will oppose the normal flow of current in the coil L1. This will result in a dip in the waveform of the coil current as shown in FIG. 3. When the armature 160 has reached the mechanical stop 170, the current will again continue to rise until it reaches a maximum value the controller 106 will allow (through the reference voltage). After that, the controller 106 and the comparator 108 can turn the switch Q1 on and off, respectively, to regulate the current, holding the solenoid valve in its 'picked-up' state, i.e., a valve 140 of the solenoid valve 200 is open.

In at least one embodiment, the reference voltage to the comparator 108 can be initially set to a higher value for a fixed period of time (e.g., in one implementation, 60 milliseconds) in order to energize or open the solenoid valve, after which the reference voltage can be dropped to a lower value that is sufficient to retain or hold the valve in an open position. Upon this reduction in reference value, the comparator 108 can sense the voltage/current is above the threshold of the reference voltage and thus each time the clocking pulse from the controller 106 turns on the switch Q1, the switch Q1 is turned off again by comparator 108 based on the sensed current/voltage being larger than the reference voltage. The current in the coil L1 will then decay until it drops below the new reference voltage, and then continue to regulate, or hold (see, e.g., FIG. 2) at the new lower value, thus retaining, or holding, the valve 140 in the open position and reducing the current consumption of the solenoid valve 200.

In at least one embodiment, the reference voltage to the comparator 108 can be ramped up in a number of steps that occur with each on/off cycle of the switch Q1. In at least one embodiment, the reference voltage to the comparator 108 can be ramped up in 30 steps that occur with each cycle. The on-time of the switch Q1 can be measured for each cycle and compared to the on-time of the previous cycle.

As explained above, when the armature 160 of the solenoid valve 200 begins to move, there is a dip in the current through the coil L1, which causes the on-time of that on/off cycle of the switch Q1 to become more than the previous cycle. In at least one embodiment, the on-time of the on/off cycle of the switch Q1, when the armature 160 of the solenoid valve 200 moves, can be at least 38% more than the on-time of the previous cycle.

The on-time of the on/off cycle of the switch Q1 can increase because of the drop in current caused by the back EMF in the coil L1, which is caused by the movement of the armature 160. The controller 106 can monitor the on-time of each on/off cycle of the switch Q1, and thus detect when the on-time of an on/off cycle of the switch Q1 is greater than the previous cycle, thereby detecting that the armature has moved. This information can then be utilized as feedback to the controller 106, another controller, passed on to an external system, or any combination thereof. For example, in at least one embodiment, the controller 106 can immediately (or at least substantially immediately) switch from energize mode to holding mode, and drop the reference voltage to that appropriate to hold the solenoid valve 200 in an energized state, i.e., with the valve 140 open.

In at least one embodiment, the controller 106 can continue stepping up the reference voltage a number of additional cycles, thereby ensuring that the solenoid valve 200 remains energized, i.e., with the valve 140 open. In at least one embodiment, the controller 106 can continue until the set number of steps, such as 30 (or another number required or desired for an implementation of the disclosure), has been reached, thereby ensuring that the solenoid valve 200 remains energized, i.e., that the valve 140 remains open. At this point, the controller 106 can set the reference voltage supplied to the comparator 108 to the holding, or low, level and the current in the solenoid will decrease to that level. Initially, during this time when the current level through the coil L1 is greater than the reference, the on-time of the on/off cycle of the switch Q1 will be minimal, because the clocking pulse from the controller 106 will turn on the SR latch 104, but it will be immediately reset by the comparator 108.

In at least one embodiment, the holding phase can continue (as described above) in the same manner as the basic hardware. In at least one embodiment, the on-time of the on/off cycle of the switch Q1 can continue to be monitored. If there is a condition such as mechanical shock that exceeds the magnetic holding force that the solenoid is exerting on the armature and causes the armature to shift back, the armature will now induce additional current in the coil L1. This additional current will cause the on-time of the on/off cycle of the switch Q1 to drop, which can be detected by the controller 106. In at least one embodiment, when the on-time of the on/off cycle of the switch Q1 drops below an on-time threshold, in the holding phase, the controller 10 can determine that the armature has shifted back and the solenoid valve 200 is no longer energized, i.e., the valve 140 is not open. In at least one embodiment, when the on-time of an on/off cycle of the switch Q1 drops below that of a previous cycle, in the holding phase, the controller 10 can determine that the armature has shifted back and the solenoid valve 200 is no longer energized, i.e., the valve 140 is not open. In at least one embodiment, when the on-time of an on/off cycle of the switch Q1 drops below that of a previous cycle by at least 38%, in the holding phase, the controller 10 can determine that the armature has shifted back and the solenoid valve 200 is no longer energized, i.e., the valve 140 is not open.

Upon detecting that the solenoid valve 200 is no longer energized, i.e., the valve 140 is not open, the controller 106 can reenergize the solenoid valve, as discussed above. Thus, by monitoring the on-time of the on/off cycle of the switch Q1, the controller 106 can diagnose the state of the solenoid valve, both during the energization phase and the holding phase.

In at least one embodiment, as shown in the top portion of FIG. 5 for instance, the reference voltage can be stepped up, in the energize phase, resulting initially in substantially uniform on-time for each on/off cycle of the switch Q1, and the current through the coil L1, as shown in the lower portion of FIG. 5, rising when the switch Q1 is on and falling when the switch Q1 is off, according to the time constant of L1. When the armature 160 begins to move, a slight dip in the current through the coil L1 can occur, causing the on-time for that on/off cycle of the switch Q1 to be longer than the preceding on-times. The controller 106 can continue stepping up the reference voltage, after detecting this change in on-time, or immediately switch to the holding phase. In the holding phase, initially the current through the coil L1 is such to cause the voltage drop across R1 to be greater than the holding phase reference voltage, and therefore the on-time for each on/off cycle of the switch Q1 is very short, until the current through the coil L1, as shown in the lower portion of FIG. 5, drops to cause the voltage drop across R1 to be less than the holding phase reference voltage. Thereafter, the on-time for each on/off cycle of the switch Q1, in the holding phase, can be substantially uniform.

In at least one embodiment, as shown in the top portion of FIG. 7 for instance, the reference voltage can be held steady, in the holding phase, resulting initially in at least substantially uniform on-time for each on/off cycle of the switch Q1, and the current through the coil L1, as shown in the lower portion of FIG. 7, rising when the switch Q1 is on and falling when the switch Q1 is off, according to the time constant of L1. If the armature 160 unexpectedly shifts, such as from a physical shock, and drops out, the on-time for that on/off cycle of the switch Q1 will be much shorter than the preceding on-times. The controller 106, upon detecting this change in on-time, can immediately switch to the energizing phase, to reenergize the solenoid valve 200 and reopen the valve 140. Then, once the controller 106 detects another change in on-time, indicating that the valve 140 has been reopened, the controller 106 can switch back to the holding phase.

In at least one embodiment, a method of operating a solenoid valve 200 can include applying power to a coil L1 of the solenoid valve 200, interrupting power to the coil 200 upon a first increase in power consumption of the coil L1, detecting a first on-time when power is applied to the coil L1, re-applying power to the coil L1 upon a first condition becoming satisfied, interrupting power to the coil L1 upon a second increase in power consumption of the coil L1, detecting a second on-time when power is re-applied to the coil L1, comparing the first on-time with the second on-time, detecting when an armature 160 of the solenoid valve 200 has physically shifted based at least in part on the comparing, or any combination thereof.

In at least one embodiment, detecting when the armature 160 of the solenoid valve 200 has physically shifted can include determining that the second on-time is greater and/or less than the first on-time. In at least one embodiment, detecting when the armature 160 of the solenoid valve has physically shifted can include determining that the second on-time is at least 38% greater than the first on-time. In at least one embodiment, detecting when the armature 160 of the solenoid valve has physically shifted can include determining that the second on-time is at least 38% less than the first on-time.

In at least one embodiment, the first and/or second increases in power consumption of the coil L1, can be the current in the resistor R1 and thus the coil L1 becoming high enough to cause the voltage drop across the resistor R1, as monitored by the comparator 108, to reach or exceed the reference voltage from the controller 106. In at least one embodiment, the reference voltage associated with the first increase in power can be the same as the reference voltage associated with the second increase in power. In at least one embodiment, the reference voltage associated with the first increase in power can be less than the reference voltage associated with the second increase in power. In at least one embodiment, the reference voltage associated with the first increase in power can be greater than the reference voltage associated with the second increase in power.

In at least one embodiment, a method of operating a solenoid valve 200 can include holding the armature 160 of the solenoid valve 200 in position by repeatedly cycling power to the coil L1 of the solenoid valve 200, wherein power is applied to the coil L1 until a voltage associated with the coil L1 reaches a first threshold and power to the coil is interrupted until the voltage associated with the coil reaches a second threshold. In at least one embodiment, the voltage associated with the coil L1 can be the voltage drop across the resistor R1, since the voltage drop across the resistor R1 is a direct result of the current through the resistor R1 and the coil L1. In at least one embodiment, a method of operating a solenoid valve 200 can include holding the armature 160 of the solenoid valve 200 in position by repeatedly cycling power to the coil L1 of the solenoid valve 200, wherein power is applied to the coil L1 until a voltage associated with the coil L1 reaches a threshold and power to the coil is interrupted until a time period has elapsed. In at least one embodiment, the time period can be set by the clocking pulse from the controller 106 and/or can be selected to ensure that the voltage drop across the resistor R1, and thus the current through the resistor R1 and the coil L1 remains sufficient to hold the armature 160 of the solenoid valve 200 in position.

In at least one embodiment, the first and second increases in power consumption of the coil L1 can be detected by monitoring a voltage associated with power being applied to the coil L1, such as the voltage drop across the resistor R1. In at least one embodiment, the first and second increases in power consumption of the coil L1 can be detected by monitoring a current through the coil L1 and/or the current through the resistor R1.

In at least one embodiment, the first and/or the second increase in power consumption of the coil L1 can be a predetermined value, which can be less than that required to cause the armature 160 of the solenoid valve 200 to physically shift. For example, in order to energize the solenoid valve 200, and open the valve 140, full power can be applied to the coil L1. This would likely cause an increase in power consumption of the coil L1 to be greater than that required to cause the armature 160 of the solenoid valve 200 to physically shift. In at least one embodiment, as discussed herein, the reference voltage provided to the comparator 108 by the controller 106, can be stepped up such that each step causes an increase in power consumption of the coil L1 that is less than that required to cause the armature 160 of the solenoid valve 200 to physically shift.

In at least one embodiment, the first condition can be a decrease in a voltage associated with the coil L1, a current drop through the coil L1, a predetermined period of time, or any combination thereof. For example, in at least one embodiment, the first condition can be a time period, such as the beginning of a subsequent clocking pulse from the controller 106.

In at least one embodiment, a method of operating a solenoid valve 200 can include applying power to a coil L1 of the solenoid valve 200, interrupting power to the coil 200 upon a power consumption of the coil 200 meeting a first threshold, detecting a first on-time when power is applied to the coil L1, re-applying power to the coil L1 upon the power consumption of the coil L1 meeting a second threshold, interrupting power to the coil L1 upon the power consumption of the coil L1 meeting the first threshold, detecting a second on-time when power is re-applied to the coil L1, comparing the first on-time with the second on-time, detecting when an armature 160 of the solenoid valve 200 has physically shifted based at least in part on the comparing, or any combination thereof. In at least one embodiment, detecting when the armature 160 of the solenoid valve 200 has physically shifted can include determining that the second on-time is greater and/or less than the first on-time. In at least one embodiment, detecting when the armature 160 of the solenoid valve 200 has physically shifted can include determining that the second on-time is at least 38% greater or less than the first on-time.

In at least one embodiment, a method of operating a solenoid valve 200 can include reversing the physical shift of the armature 160 of the solenoid valve 200 upon detecting that the armature 160 of the solenoid valve 200 has physically shifted. In at least one embodiment, reversing the physical shift of the armature 160 of the solenoid valve 200 can include repeatedly cycling power to the coil L1.

In at least one embodiment, power can be applied to the coil L1 until an increase in power consumption of the coil L1 occurs, when the power applied to the coil L1 can be interrupted until a first condition is satisfied. In at least one embodiment, power can be applied to the coil L1 until an increase in power consumption of the coil L1 reaches a first threshold. In at least one embodiment, the first threshold can include a first voltage associated with the coil L1, such as the voltage drop across the resistor R1, rising to a first voltage, such as a first reference voltage. In at least one embodiment, the second threshold can include the first voltage associated with the coil L1 falling to a second voltage, such as a minimum voltage drop associated with a minimum current flow through the coil L1 that is sufficient to hold the solenoid valve 200 energized. In at least one embodiment, the first threshold can include a current through the coil L1 rising to a first amperage. In at least one embodiment, the second threshold can include a current through the coil L1 falling to a second amperage, such as the minimum current flow through the coil L1 that is sufficient to hold the solenoid valve 200 energized.

In at least one embodiment, a method of operating a solenoid valve 200 can include physically shifting an armature 160 of the solenoid valve 200 in a first direction, detecting when the armature 160 of the solenoid valve 200 has physically shifted in the first direction, holding the armature 160 of the solenoid valve 200 in position, detecting when the armature 160 of the solenoid valve 200 has physically shifted in a second direction, or any combination thereof.

In at least one embodiment, physically shifting an armature 160 of the solenoid valve 200 in a first can include applying power to a coil L1 of the solenoid valve 200, interrupting power to the coil L1 upon a first increase in power consumption of the coil L1, detecting a first on-time when power is applied to the coil L1, re-applying power to the coil L1 upon a first condition becoming satisfied, interrupting power to the coil L1 upon a second increase in power consumption of the coil L1, detecting a second on-time when power is re-applied to the coil L1, comparing the first on-time with the second on-time, or any combination thereof. In at least one embodiment, detecting when the armature 160 of the solenoid valve 200 has physically shifted in the first direction can include determining that the second on-time is greater than the first on-time. In at least one embodiment, detecting when the armature 160 of the solenoid valve 200 has physically shifted can include determining that the second on-time is at least 38% greater or less than the first on-time.

In at least one embodiment, holding the armature 160 of the solenoid valve 200 in position can include re-applying power to the coil L1 of the solenoid valve 200, interrupting power to the coil L1 upon a power consumption of the coil L1 meeting a first threshold, detecting a third on-time when power is re-applied to the coil L1, re-applying power to the coil L1 of the solenoid valve upon the power consumption of the coil L1 meeting a second threshold, interrupting power to the coil L1 upon the power consumption of the coil L1 meeting the first threshold, detecting a fourth on-time when power is re-applied to the coil L1, comparing the third on-time with the fourth on-time, or any combination thereof. In at least one embodiment, detecting when the armature 160 of the solenoid valve 200 has physically shifted in a second direction can include determining that the fourth on-time is less than the third on-time. In at least one embodiment, the first and second thresholds can be the same. In at least one embodiment, the first threshold can be greater than the second threshold. In at least one embodiment, the first threshold can be less than the second threshold. In at least one embodiment, any of the thresholds and/or conditions discussed herein can be in terms of voltage, current, time, or any combination thereof.

In at least one embodiment, a method of operating a solenoid valve can include applying power to a coil of the solenoid valve, interrupting power to the coil upon a first increase in power consumption of the coil, detecting a first on-time when power is applied to the coil, re-applying power to the coil upon a first condition becoming satisfied, interrupting power to the coil upon a second increase in power consumption of the coil, detecting a second on-time when power is re-applied to the coil, comparing the first on-time with the second on-time, detecting when an armature of the solenoid valve has physically shifted based at least in part on the comparing, or any combination thereof. In at least one embodiment, detecting when the armature of the solenoid valve has physically shifted can include determining that the second on-time is at least 38% greater or less than the first on-time. In at least one embodiment, a method of operating a solenoid valve can include holding the armature of the solenoid valve in position by repeatedly cycling power to the coil of the solenoid valve, wherein power is applied to the coil until a voltage associated with the coil reaches a first threshold and power to the coil is interrupted until the voltage associated with the coil reaches a second threshold.

In at least one embodiment, the first and second increases in power consumption of the coil can be detected by monitoring a voltage associated with power being applied to the coil. In at least one embodiment, the first and second increases in power consumption of the coil can be detected by monitoring a current through the coil. In at least one embodiment, the first and/or the second increase in power consumption of the coil can be a predetermined value, which can be less than that required to cause the armature of the solenoid valve to physically shift.

In at least one embodiment, the first condition can be a decrease in a voltage associated with the coil, a current drop through the coil, a predetermined period of time, or any combination thereof. In at least one embodiment, detecting when the armature of the solenoid valve has physically shifted can include determining that the second on-time is greater and/or less than the first on-time.

In at least one embodiment, a method of operating a solenoid valve can include applying power to a coil of the solenoid valve, interrupting power to the coil upon a power consumption of the coil meeting a first threshold, detecting a first on-time when power is applied to the coil, re-applying power to the coil upon the power consumption of the coil meeting a second threshold, interrupting power to the coil upon the power consumption of the coil meeting the first threshold, detecting a second on-time when power is re-applied to the coil, comparing the first on-time with the second on-time, detecting when an armature of the solenoid valve has physically shifted based at least in part on the comparing, or any combination thereof. In at least one embodiment, detecting when the armature of the solenoid valve has physically shifted can include determining that the second on-time is greater and/or less than the first on-time. In at least one embodiment, detecting when the armature of the solenoid valve has physically shifted can include determining that the second on-time is at least 38% greater or less than the first on-time.

In at least one embodiment, a method of operating a solenoid valve can include reversing the physical shift of the armature of the solenoid valve upon detecting that the armature of the solenoid valve has physically shifted. In at least one embodiment, reversing the physical shift of the armature of the solenoid valve can include repeatedly cycling power to the coil. In at least one embodiment, power can be applied to the coil until an increase in power consumption of the coil occurs, when the power applied to the coil can be interrupted until a first condition is satisfied.

In at least one embodiment, the first threshold can include a first voltage associated with the coil rising to a first voltage. In at least one embodiment, the second threshold can include the first voltage associated with the coil falling to a second voltage.

In at least one embodiment, the first threshold can include a current through the coil rising to a first amperage. In at least one embodiment, the second threshold can include a current through the coil falling to a second amperage.

In at least one embodiment, a method of operating a solenoid valve can include physically shifting an armature of the solenoid valve in a first direction, detecting when the armature of the solenoid valve has physically shifted in the first direction, holding the armature of the solenoid valve in position, detecting when the armature of the solenoid valve has physically shifted in a second direction, or any combination thereof.

In at least one embodiment, physically shifting an armature of the solenoid valve in a first can include applying power to a coil of the solenoid valve, interrupting power to the coil upon a first increase in power consumption of the coil, detecting a first on-time when power is applied to the coil, re-applying power to the coil upon a first condition becoming satisfied, interrupting power to the coil upon a second increase in power consumption of the coil, detecting a second on-time when power is re-applied to the coil, comparing the first on-time with the second on-time, or any combination thereof. In at least one embodiment, detecting when the armature of the solenoid valve has physically shifted in the first direction can include determining that the second on-time is greater than the first on-time. In at least one embodiment, detecting when the armature of the solenoid valve has physically shifted can include determining that the second on-time is at least 38% greater or less than the first on-time.

In at least one embodiment, holding the armature of the solenoid valve in position can include re-applying power to the coil of the solenoid valve, interrupting power to the coil upon a power consumption of the coil meeting a first threshold, detecting a third on-time when power is re-applied to the coil, re-applying power to the coil of the solenoid valve upon the power consumption of the coil meeting a second threshold, interrupting power to the coil upon the power consumption of the coil meeting the first threshold, detecting a fourth on-time when power is re-applied to the coil, comparing the third on-time with the fourth on-time, or any combination thereof. In at least one embodiment, detecting when the armature of the solenoid valve has physically shifted in a second direction can include determining that the fourth on-time is less than the third on-time.

Other and further embodiments utilizing one or more aspects of the disclosure can be devised without departing from the spirit of Applicants' disclosure. For example, the devices, systems and methods can be implemented for numerous different types and sizes in numerous different industries. Further, the various methods and embodiments of the devices, systems and methods can be included in combination with each other to produce variations of the disclosed methods and embodiments. Discussion of singular elements can include plural elements and vice versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the following claims.

What is claimed is:

1. A method of operating a solenoid valve, the method comprising:
applying power to a coil of the solenoid valve;
interrupting power to the coil upon a first increase in power consumption of the coil;
detecting a first on-time when power is applied to the coil;
re-applying power to the coil upon a first condition becoming satisfied;
interrupting power to the coil upon a second increase in power consumption of the coil;
detecting a second on-time when power is re-applied to the coil;
comparing the first on-time with the second on-time; and
detecting when an armature of the solenoid valve has physically shifted based at least in part on the comparing.

2. The method of claim 1, wherein the first and second increases in power consumption of the coil are detected by monitoring a first voltage associated with power being applied to the coil.

3. The method of claim 1, wherein the first and second increases in power consumption of the coil are detected by monitoring a current through the coil.

4. The method of claim 1, wherein the first and second increases in power consumption of the coil are both a predetermined value less than that required to cause the armature of the solenoid valve to physically shift.

5. The method of claim 1, wherein the first condition is a decrease in a voltage associated with the coil.

6. The method of claim 1, wherein the first condition is a current drop through the coil.

7. The method of claim 1, wherein the first condition is a predetermined period of time.

8. The method of claim 1, wherein detecting when the armature of the solenoid valve has physically shifted comprises determining that the second on-time is greater than the first on-time.

9. The method of claim 1, wherein detecting when the armature of the solenoid valve has physically shifted comprises determining that the second on-time is less than the first on-time.

10. The method of claim 1, further comprising holding the armature of the solenoid valve in position by repeatedly cycling power to the coil of the solenoid valve, wherein power is applied to the coil until a voltage associated with the coil reaches a first threshold and power to the coil is interrupted until the voltage associated with the coil reaches a second threshold.

11. A method of operating a solenoid valve, the method comprising:
applying power to a coil of the solenoid valve;
interrupting power to the coil upon a power consumption of the coil meeting a first threshold;
detecting a first on-time when power is applied to the coil;
re-applying power to the coil upon the power consumption of the coil meeting a second threshold;
interrupting power to the coil upon the power consumption of the coil meeting the first threshold;
detecting a second on-time when power is re-applied to the coil;
comparing the first on-time with the second on-time; and
detecting when an armature of the solenoid valve has physically shifted based at least in part on the comparing.

12. The method of claim 11, wherein the first threshold comprises a first voltage associated with the coil rising to a first voltage.

13. The method of claim 12, wherein the second threshold comprises the first voltage associated with the coil falling to a second voltage.

14. The method of claim 11, wherein the first threshold comprises a current through the coil rising to a first amperage.

15. The method of claim 14, wherein the second threshold comprises a current through the coil falling to a second amperage.

16. The method of claim 11, wherein detecting when the armature of the solenoid valve has physically shifted comprises determining that the second on-time is less than the first on-time.

17. The method of claim 11, wherein detecting when the armature of the solenoid valve has physically shifted comprises determining that the second on-time is greater than the first on-time.

18. The method of claim 11, further comprising reversing the physical shift of the armature of the solenoid valve upon detecting that the armature of the solenoid valve has physically shifted.

19. The method of claim 18, wherein reversing the physical shift of the armature of the solenoid valve comprises repeatedly cycling power to the coil, and wherein power is applied to the coil until an increase in power consumption of the coil occurs when the power applied to the coil is interrupted until a first condition is satisfied.

20. A method of operating a solenoid valve, the method comprising:
physically shifting an armature of the solenoid valve in a first direction by—applying power to a coil of the solenoid valve;

15 interrupting power to the coil upon a first increase in power consumption of the coil;

detecting a first on-time when power is applied to the coil;

re-applying power to the coil upon a first condition becoming satisfied;

interrupting power to the coil upon a second increase in power consumption of the coil;

detecting a second on-time when power is re-applied to the coil; and comparing the first on-time with the second on-time;

detecting when the armature of the solenoid valve has physically shifted in the first direction by determining that the second on-time is greater than the first on-time;

holding the armature of the solenoid valve in position by—re-applying power to the coil of the solenoid valve;

16 interrupting power to the coil upon a power consumption of the coil meeting a first threshold;

detecting a third on-time when power is re-applied to the coil;

re-applying power to the coil of the solenoid valve upon the power consumption of the coil meeting a second threshold;

interrupting power to the coil upon the power consumption of the coil meeting the first threshold;

detecting a fourth on-time when power is re-applied to the coil; and comparing the third on-time with the fourth on-time; and detecting when the armature of the solenoid valve has physically shifted in a second direction by determining that the fourth on-time is less than the third on-time.

* * * * *